US010398081B2

(12) United States Patent
Isaac

(10) Patent No.: US 10,398,081 B2
(45) Date of Patent: Sep. 3, 2019

(54) STRAW SPREADER AND CHAFF SPREADER FOR A COMBINE HARVESTER

(71) Applicant: CNH Industrial America LLC, New Holland, PA (US)

(72) Inventor: Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 302 days.

(21) Appl. No.: 15/387,773

(22) Filed: Dec. 22, 2016

(65) Prior Publication Data
US 2018/0177126 A1 Jun. 28, 2018

(51) Int. Cl.
*A01D 41/12* (2006.01)
*A01F 12/18* (2006.01)
*A01F 12/44* (2006.01)

(52) U.S. Cl.
CPC .......... *A01D 41/1243* (2013.01); *A01F 12/18* (2013.01); *A01F 12/44* (2013.01)

(58) Field of Classification Search
CPC ..... A01D 41/1243; A01F 7/062; A01F 12/40; A01F 12/48; A01F 12/446; A01F 12/18; A01F 12/44
USPC ............................................. 460/1, 111, 112
See application file for complete search history.

(56) References Cited

U.S. PATENT DOCUMENTS

| 4,617,942 A | 10/1986 | Garner | |
|---|---|---|---|
| 5,082,186 A * | 1/1992 | Bruns | A01D 41/1243 239/667 |
| 7,390,253 B2 * | 6/2008 | Farley | A01D 41/1243 239/673 |
| 7,896,732 B2 | 3/2011 | Benes et al. | |
| 8,585,475 B2 * | 11/2013 | Isaac | A01D 41/1243 460/111 |
| 8,616,945 B2 | 12/2013 | Ritter et al. | |
| 2004/0092298 A1 | 5/2004 | Holmen | |
| 2005/0124399 A1 * | 6/2005 | Holmen | A01D 41/1243 460/111 |
| 2007/0256403 A1 | 11/2007 | Teroerde et al. | |
| 2009/0088231 A1 * | 4/2009 | Murray | A01D 41/1243 460/111 |

(Continued)

FOREIGN PATENT DOCUMENTS

WO    2008156419 A1    12/2008

OTHER PUBLICATIONS

European Search Report for European Application No. 17209823.8, dated May 23, 2018 (6 pages).

*Primary Examiner* — Robert E Pezzuto
(74) *Attorney, Agent, or Firm* — Peter K. Zacharias; Patrick M. Sheldrake

(57) ABSTRACT

A spreader system of an agricultural vehicle for spreading crop residue including first and second spreader devices and a chute. The first spreader device includes a plurality of first paddles configured to rotate about a first axis, the rotation of the first paddles producing a first stream of crop residue. The second spreader device includes a plurality of second paddles configured to rotate about a second axis, the rotation of the second paddles producing a second stream of crop residue. The chute receives the first stream of crop residue and the second stream of crop residue flow respectively from the first spreader device and the second spreader device. The first stream and the second stream of crop residue are combined in the chute.

20 Claims, 5 Drawing Sheets

(56) References Cited

U.S. PATENT DOCUMENTS

| | | | |
|---|---|---|---|
| 2009/0287380 A1* | 11/2009 | Chervenka | A01D 41/1243 701/50 |
| 2011/0070934 A1* | 3/2011 | Teroerde | A01D 41/1243 460/112 |
| 2012/0302300 A1 | 11/2012 | Holmén | |
| 2013/0095899 A1 | 4/2013 | Knapp | |
| 2015/0351321 A1* | 12/2015 | Shane | A01D 41/1243 460/1 |
| 2016/0106040 A1* | 4/2016 | Biggerstaff | A01D 41/1243 460/112 |

* cited by examiner

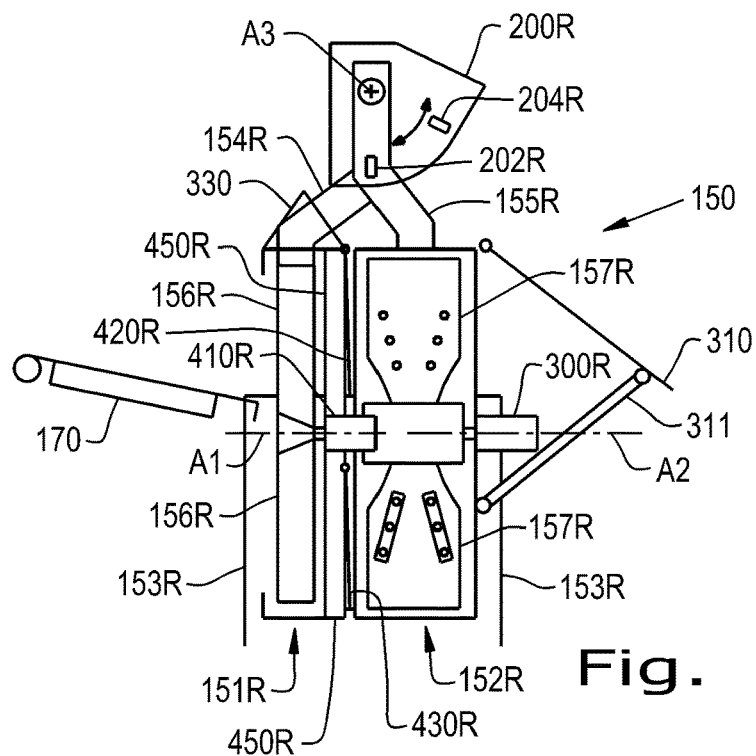
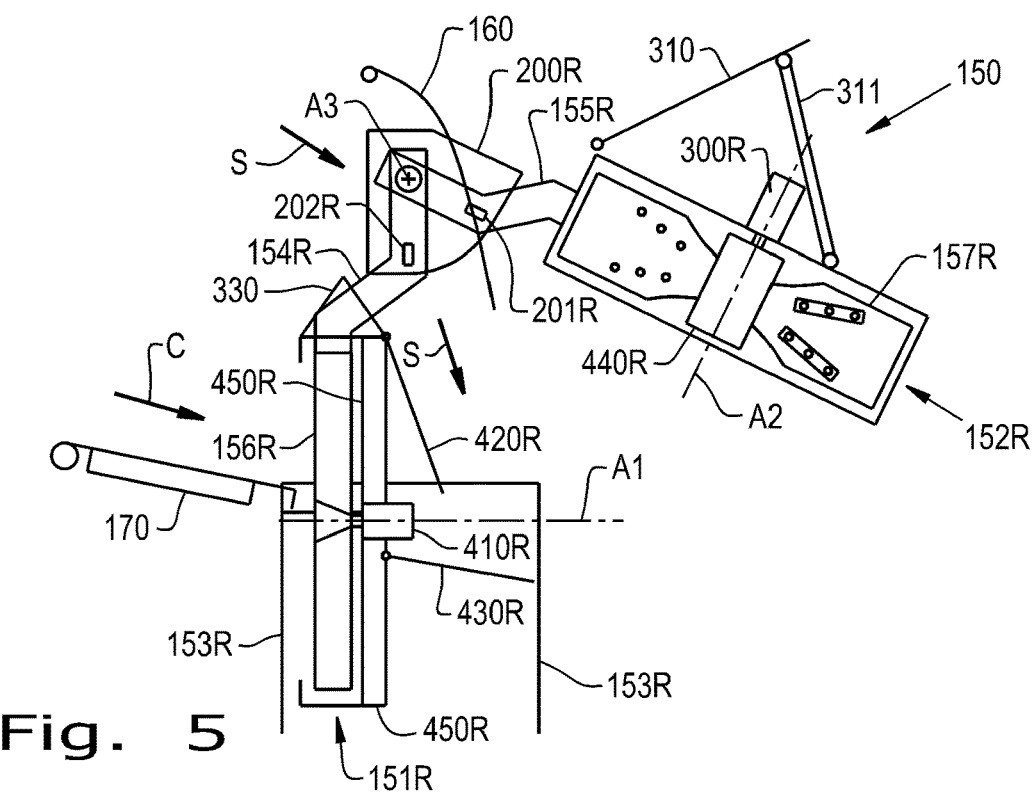

STRAW SPREADER AND CHAFF SPREADER
FOR A COMBINE HARVESTER

FIELD OF THE INVENTION

The present invention relates to agricultural harvesters, such as combine harvesters, and, more specifically to crop residue spreader systems included in such combine harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

Residue spreaders can be of horizontal and vertical types. A horizontal spreader includes a spreader device with a rotor driven on a generally vertical axis and a plurality of vanes or paddles on the rotor to propel residue in a wide swath behind the combine. Commonly, two such side-by-side rotors are used, the rotors rotating in opposite directions within a housing. After being chopped, the crop residue enters the rotor area through a vertical inlet in the spreader housing, and as the paddles rotate about the axis the residue is propelled towards a tangential outlet of the housing. Typically, the tangential outlet of the housing is formed by a deflector whose orientation and shape determines the spread pattern of the crop residue. It is known to use adjustable structures of the housing and deflector to control the outlet flow of material, by adjusting the size and position of the deflector and of the space between the rotor paddles and the adjustable structures, to achieve a substantially even distribution of the crop residue material across the width of a distribution swath behind the combine. It is desirable to achieve an even distribution of material for more even and consistent residue material breakdown and to facilitate subsequent field tilling and seeding operations.

A vertical spreader includes a rotor driven on a generally horizontal axis and a plurality of vanes or paddles on the rotor to propel residue from the spreader housing. Again, commonly two such side-by-side rotors are used, rotating in opposite directions.

As combine harvesters increase in size and crop processing capability, the width of the header of the combine can increase in order to make fewer passes in a field. As the width of the header increases, so too must the spread width of crop residue behind the combine in order to uniformly cover the field which now is mostly bare of crops. The spread width can be adjusted, for example, by increasing the rotational speed of the rotors and paddles so the crop material is spread a greater distance from the spreader system. The positioning of the deflector is controlled to prevent, for example, crop residue being spread onto standing crop, which would then be collected and reprocessed by the combine.

One particular problem that arises with greater spread widths is the creation of "stripes" of high and low volumes of crop residue along the driving direction of the combine in hard crop conditions. The stripes of high and low crop residue volumes are an uneven thickness of the crop residue, with higher thickness of the crop residue resulting in a high volume stripe and lower thickness of the crop residue resulting in a low volume stripe. The stripes of crop residue distribution can lead to some areas of the field being practically bare of crop residue, with little added nutrients from the residue, while other areas of the field have excess crop residue that can interfere with seeding and tilling.

What is needed in the art is a vertically mounted chaff spreader and straw spreader to uniformly distribute the chaff and straw across the full cut width, even distributing the chaff over the full width when windrowing the straw.

SUMMARY OF THE INVENTION

Exemplary embodiments of the present invention provide for the combining of a chaff spreader flow and a straw spreader flow.

In accordance with an aspect of the present invention, there is provided a spreader system of an agricultural vehicle for spreading crop residue that includes first and second spreader devices and a chute. The first spreader device includes a plurality of first paddles configured to rotate about a first axis, the rotation of the first paddles producing a first stream of crop residue. The second spreader device includes a plurality of second paddles configured to rotate about a second axis, the rotation of the second paddles producing a second stream of crop residue. The chute receives the first stream of crop residue and the second stream of crop residue flow respectively from the first spreader device and the second spreader device. The first stream and the second stream of crop residue are combined in the chute.

In accordance with another aspect of the present invention, there is provided an agricultural vehicle with a threshing system, a cleaning system and a spreading system. The threshing system provides a first crop residue stream and the cleaning system provides a second crop residue stream to the spreading system. The spreading system includes first and second spreader devices and a chute. The first spreader device includes a plurality of first paddles configured to rotate about a first axis, the rotation of the first paddles receiving the first stream of crop residue. The second spreader device includes a plurality of second paddles configured to rotate about a second axis, the rotation of the second paddles receiving the second stream of crop residue. The chute receives the first stream of crop residue and the second stream of crop residue that flows respectively from the first spreader device and the second spreader device. The first stream and the second stream of crop residue are combined in the chute.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 4 is a view of a cross-section taken along section line A-A of FIG. 2, of the spreader system of FIG. 1 illustrating both the chaff spreader and the straw spreader in a lowered position, in accordance with another exemplary embodiment of the present invention;

FIG. 5 is a view of a cross-section of the spreader system of FIG. 1 illustrating the chaff spreader in the lowered position and the straw spreader in a raised position, in accordance with an exemplary embodiment of the present invention;

DETAILED DESCRIPTION OF THE INVENTION

The terms "grain", "straw", "chaff" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG (Material Other than Grain). The word "straw" refers to the stalk of the crop and it may be chopped before distribution on the field. The word "chaff" refers to the material that is removed during the sieve or sifting process and is generally smaller and lighter than the straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
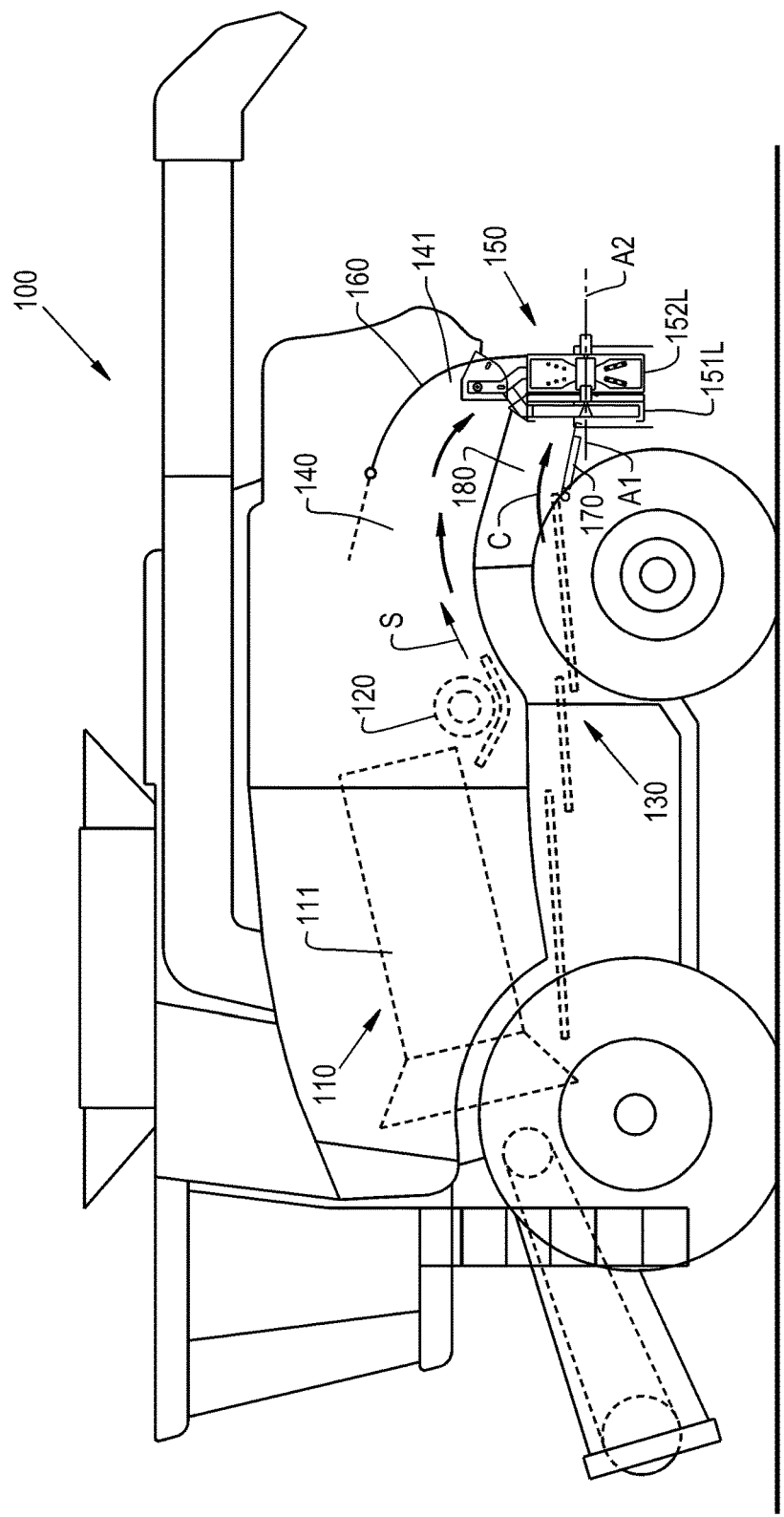
FIG. 1 is a partially sectioned side view of an exemplary embodiment of a harvesting machine with an exemplary embodiment of a spreader system of the present invention, the spreader system including at least one chaff spreader and at least one straw spreader.

Referring now to the drawings, and more particularly to FIG. 1, there is shown an exemplary embodiment of an agricultural vehicle 100 in the form of a combine 100 which is representative of a wide variety of agricultural harvesting machines and which generally includes a threshing system 110 having a rotor 111 rotatable in a known manner for separating the desirable crop component or grain from straw, stalks and other plant residue. A beater 120 is rotatable for propelling or directing a flow or stream of the plant residue, generally referred to as straw S, toward the rear of combine 100. A cleaning system 130 receives the threshed crop component from threshing system 110 and removes chaff and other remaining residue such as seedpods, husks and the like, generally referred to as chaff C, and directs a flow or stream of chaff C toward the aft end of combine 100. Straw S passes through a cavity 140 toward a spreader assembly 150 at a lower opening 141 of cavity 140. A pivotal windrow door 160 defines a boundary for the travel of straw S. Chaff C also is directed toward the spreader assembly 150 traveling above a chaff pan 170 through a cavity 180 such that chaff C enters the spreader assembly 150. Chaff pan 170 is coupled to combine 100 and is arranged to allow spreader assembly 150 to pivot therefrom. This departure of spreader assembly 150 then causes chaff pan 170 to provide the final direction to the flow of chaff C as it leaves combine 100.

The spreader assembly 150 includes at least one chaff spreader 151L aligned with an axis A1 and at least one straw spreader 152L aligned with an axis A2. Greater details of the attributes of spreader assembly 150 are illustrated in subsequent figures. It should be appreciated that while spreader assembly 150 is shown and described herein as a vertical spreader assembly 150, the principles of the spreader assembly 150 can also be applied to spreader assemblies that are oriented differently.

Figure 2:
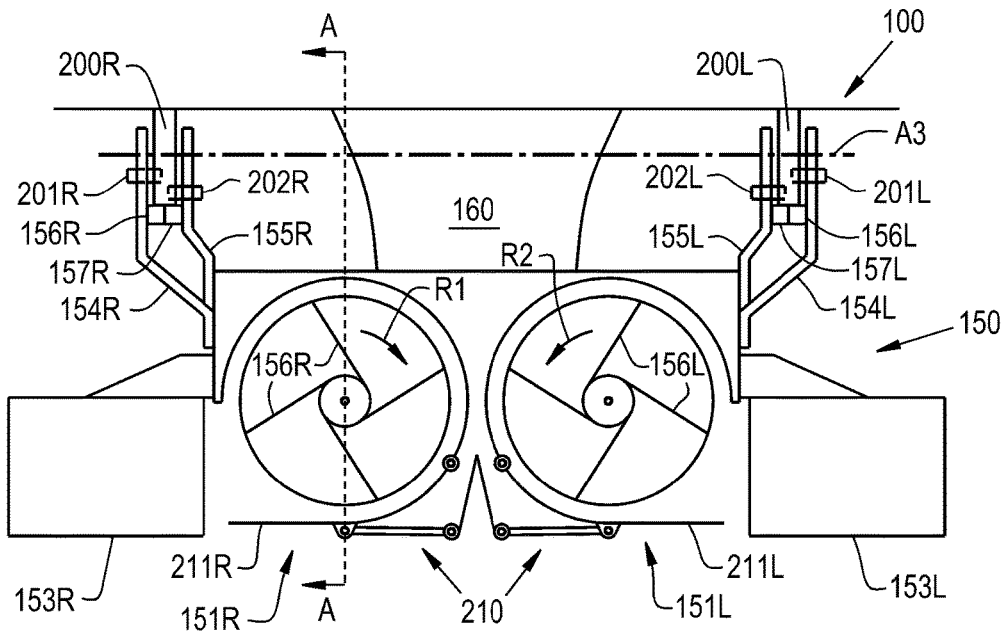
FIG. 2 is a view of the spreader system introduced in FIG. 1 looking aft of the harvesting machine of FIG. 1, in accordance with an exemplary embodiment of the present invention.

Illustrated in FIG. 2 is a view of the spreader assembly 150 looking to the aft of combine 100 and directly at chaff spreaders 151L and 151R. As used herein, "left," "right," "fore," and "aft" refer to sides of the combine harvester 100. These terms are also used herein to describe the placement of elements of the combine harvester 100 and the spreader assembly 150 relative to the harvester 100. Thus, the left chaff spreader 151L is disposed on the left side of the spreader assembly 150 and on the left side of the combine harvester 100; the right chaff spreader 151R is disposed on the right side of the spreader assembly 150 and on the right side of the combine harvester 100; etc. In discussion below, where context permits, the designators "L" and "R" are omitted from the reference numbers. When "L" or "R" is omitted, reference to an element, e.g., the chaff spreader 151, may be a generic reference to a chaff spreader 151, i.e., the reference is to either the left chaff spreader 151L or the right chaff spreader 151R, or a reference to both of the chaff spreaders 151L, 151R.

Figure 3:
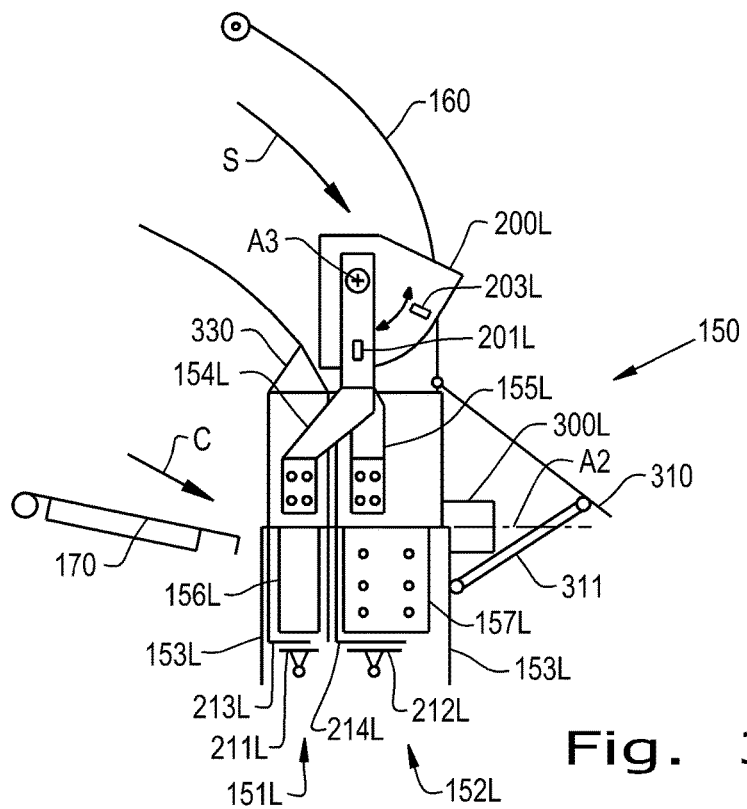
FIG. 3 is a left side view of the spreader system of FIG. 1, in accordance with an exemplary embodiment of the present invention.

With reference to FIG. 2 spreader system 150 includes side by side spreader devices 151L and 151R supported for counter rotation as indicated by arrows R1 and R2, about axes A1 for each device. While straw spreader devices 152L and 152R are not seen in FIG. 2, they are respectively located immediately aft of chaff spreader devices 151L and 151R, as can be seen in FIG. 3. The system 150 further includes chutes 153L and 153R, which are respectively shown downstream of spreader devices 151L and 151R, with the crop residue streams from chaff spreader devices 151L and 151R and from straw spreader devices 152L and 152R combining as the streams respectively travel to the right and left of combine 100. Chute 153 is connected to either a portion of the chassis of combine 100 or chute 153 can be connected to chaff spreader device 151. If chute 153 is connected to chaff spreader device 151 then as chaff spreader device 151 is pivoted chute 153 travels with chaff spreader device 151.

In FIG. 2 two sets of arms 154L, 154R and 155L, 155R are shown for each side of the spreader system 150. The arms 154L and 155L are coupled to the chaff spreader device 151L and the straw spreader device 152L. The arms 154R and 155R are coupled to the chaff spreader device 151R and the straw spreader device 152R. Plates 200L and 200R are coupled to combine 100 and provide support for respective left and right spreader devices 151 and 152. As seen in FIGS. 3 and 4 disposed in plate 200L is a groove or slot 203L, and disposed in plate 200R is a groove or slot 204R. Slot 203L is arranged to provide a holding position for arm 154L by way of a locking device 201L. In a similar fashion slot 204R is arranged to interact with locking device 202R to hold arm 155R in a raised pivoted position. Slots 203 and 204 may be aligned, even being a through slot, so that locking devices 201 and 202 can used each side of the collocated slots 203 and 204. However, it is also contemplated that slots 201 and 202 are arranged at differing distances from axis A3, as can be seen in FIG. 2, where the relative positions of locking devices 201 and 202 can be seen to be at differing distances from axis A3.

Arms 154 and 155 are pivotally connected to plate 200 about axis A3, and are respectively moved by actuators 156 and 157, that are shown schematically in FIG. 2 as actuators 156L, 156R, 157L and 157R. Locking devices 201L and 202L are respectively coupled to arms 154L and 155L to hold arms 154L and 155L in predetermined positions via engagement with respective grooves or slots 203 and 204, angularly constrained about pivot axis A3. Similarly, locking devices 201R and 202R are respectively coupled to arms 154R and 155R to hold arms 154R and 155R in predetermined positions via engagement with respective groove or slot 203R, angularly constrained about pivot axis A3.

FIGS. 2 and 3 also illustrates a deflector system 210 that includes movable deflectors 211 and 212 that shift fore and aft to respectively shift the flows of chaff C and straw S. Movable deflectors 211 are shown as 211L and 211R respectively associated with chaff spreader devices 151L and 151R. Movable deflectors 212 similarly are associated with straw spreader devices 152 with movable deflector 212L being illustrated in FIG. 3. Deflector system 210 also includes wrappers 213 and 214 that are illustrated in FIG. 3 as wrapper 213L and 214L respectively associated with chaff spreader device 151L and straw spreader device 152L. Wrappers 213 and 214 are fixed portions of deflector system 210, while, as discussed above deflectors 211 and 212 are movable so as to shift the fore and aft direction of chaff C and straw S as they enter chutes 153.

FIG. 3 illustrates a view of the spreader assembly 150 from the left side of combine 100. Thus, FIG. 3 illustrates the left-side spreader devices 151L and 152L. With reference to FIG. 3, a motor 300L drives at least spreader device 152L about axis A2. The shafts of spreader devices 152L and 151L may be coaxial, and at least temporarily coupled, so that motor 300L can drive both spreader devices 151L and 152L. Motor 300L is a hydraulic motor 300L in an exemplary embodiment of the invention, but it can also be an electric motor or some other type of motor/actuator.

Referring again to FIG. 2 chaff spreader devices 151L, 151R each respectively have multiple paddles or impellers 156L, 156R, and likewise straw spreader devices 152L, 152R each respectively have multiple paddles 157L, 157R. Paddles 156 and 157 move air and their respective crop residue streams causing the streams to leave the spreaders and the streams meet and mingle in chutes 153, with the chaff and straw residue streams combining to be spread on the field.

FIG. 3 additionally illustrates a windrow chute panel 310 that is angularly adjustable by way of an adjustment actuator 311. Windrow chute panel 310 is pivotally coupled to straw spreader devices 152 and while one adjustment actuator 311 is illustrated it is contemplated that more than one may be used. Windrow chute panel 310 directs the flow of straw in the event that windrow door 160 is opened allowing a windrow of straw to be directed to the ground. Windrow chute panel 310 protects motors 300 from the flow of straw and allows for a smooth transition of straw to the windrow.

A deflector 330 is positioned above chaff spreader devices 151 to prevent crop residue from accumulating on top of chaff spreader devices 151. This prevents material from clumping or otherwise falling into paddles 156 in a non-uniform manner.

Figure 6:
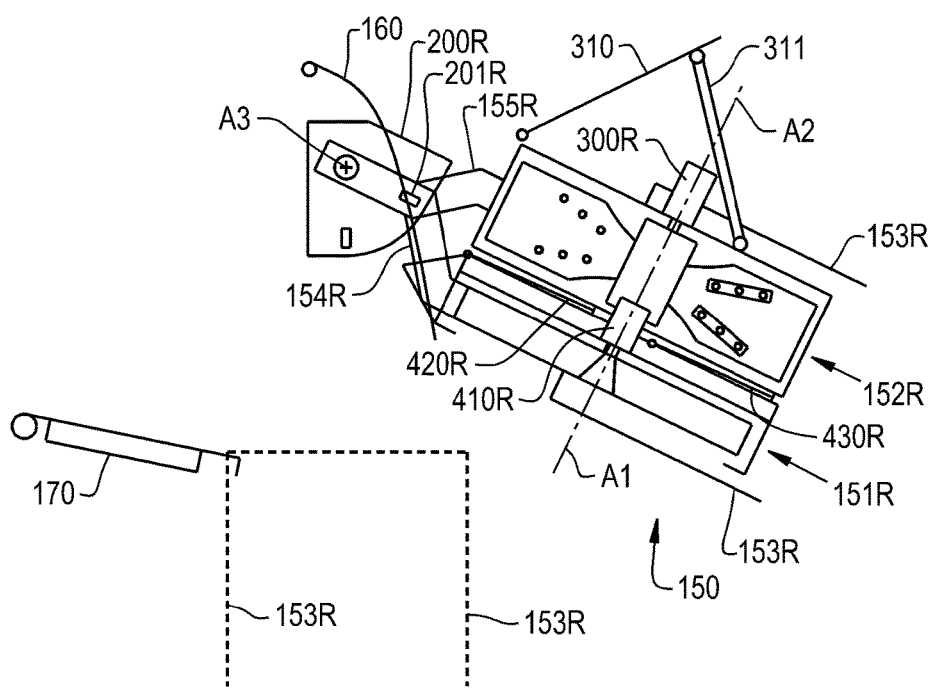
FIG. 6 is view of a cross-section of the spreader system of FIG. 1 illustrating both the chaff spreader and the straw spreader in a raised position, in accordance with an exemplary embodiment of the present invention.

Now, referring to FIGS. 4-6, there is illustrated a view of a cross-section of the chaff spreader assembly 150 taken along a line A-A in FIG. 2, in accordance with an exemplary embodiment of the present invention. FIGS. 4-6 illustrate a cross-sectional view of the right spreader devices 151R, 152R. As illustrated, the chaff spreader assembly 150 further includes a motor 410R driving the chaff spreader device 151R Likewise, the chaff spreader assembly 150 further includes a motor 410L driving the chaff spreader device 151L. Because the spreader assembly 150 comprises separate motors for the chaff spreader devices 151R and the straw spreader devices 152R, the devices 151R and 152R may be driven at the same or differing speeds. FIG. 4 illustrates a configuration in which the spreader devices 151R, 152R are in their lowered positions for operation to spread chaff C and straw S, respectively. In this position, the motor 410R of the chaff spreader device 151R is nested within a hub or center support 440R of the straw spreader device 152R.

FIG. 4 also illustrates deflectors 420R and 430R, which are in a stowed position, but are shown deployed in FIG. 5.

Deflectors 420 and 430 may be spring loaded to deploy when straw spreader devices 152 are pivoted away from chaff spreader devices 151 to thereby deflect a flow of straw S as shown in FIG. 5. Deflectors 420R and 430R are pivotally connected to frame 450R. Frame 450R provides support to motor 410R and other portions of chaff spreader device 151R.

FIG. 5 illustrates a configuration in which the spreader device 152R has been pivoted upward and outward relative to combine 100, away from spreader device 151R. In such configuration, motor 300R may be inactivated because the straw spreader 152R is not disposed below the lower opening 141 of the cavity 140 and, therefore, is not receiving straw. Chaff spreader device 151R is continued to be powered by motor 410R so that chaff C is distributed by way of chute 153R onto the field. Meanwhile straw S exits the lower opening 141 of the cavity 140 and is deposited in a windrow behind combine 100. As noted elsewhere herein, chute 153R is illustrated as being coupled to chaff spreader device 151R so that as chaff spreader 151R transitions from being in the position shown in FIG. 5 to that shown in FIG. 6 chute 153R swings outward with chaff spreader device 151R. Deflectors 420R and 430R return to a stowed position when chaff spreader device 151R nests with straw spreader device 152R, again as shown in FIG. 6.

FIG. 6 illustrates a configuration in which both spreader devices 151R and 152R have been pivoted upward and outward to a predetermined angular position and locked by way of locking devices 201R, 202R. In this position axis A1 and A2 are coaxial, and that relationship can be maintained as spreader devices 151R and 152R are pivoted together from the position as shown in FIG. 4 to the position shown in FIG. 6, or in the reverse direction. Spreader device 152R is configured to swing upward and outward from chute 153R and spreader device 151R, then when spreader device 151R swings upward and outward toward the spreader device 152R, chute 153, which is attached to spreader device 151R, swings along with spreader device 151R. It is also contemplated that chutes 153 will remain stationary relative to the combine harvester 100, as it is attached to the chassis or other fixed portion of the combine harvester 100 as shown with the dashed line position of chute 153 R in FIG. 6.

Figure 7:
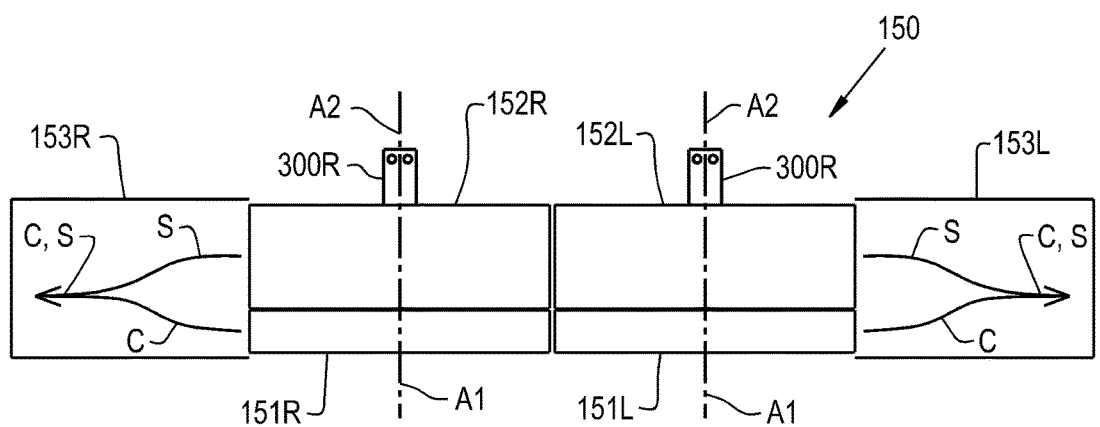
FIG. 7 is a somewhat schematized top view illustrating the combined flows of straw and chaff of the spreader systems introduced in FIG. 1, in accordance with an exemplary embodiment of the present invention.

Now, additionally referring to FIG. 7 there is shown a top view of spreader system 150 which illustrates the combining of chaff C stream and straw S stream as they leave spreader devices 151 and 152.

Figure 8:
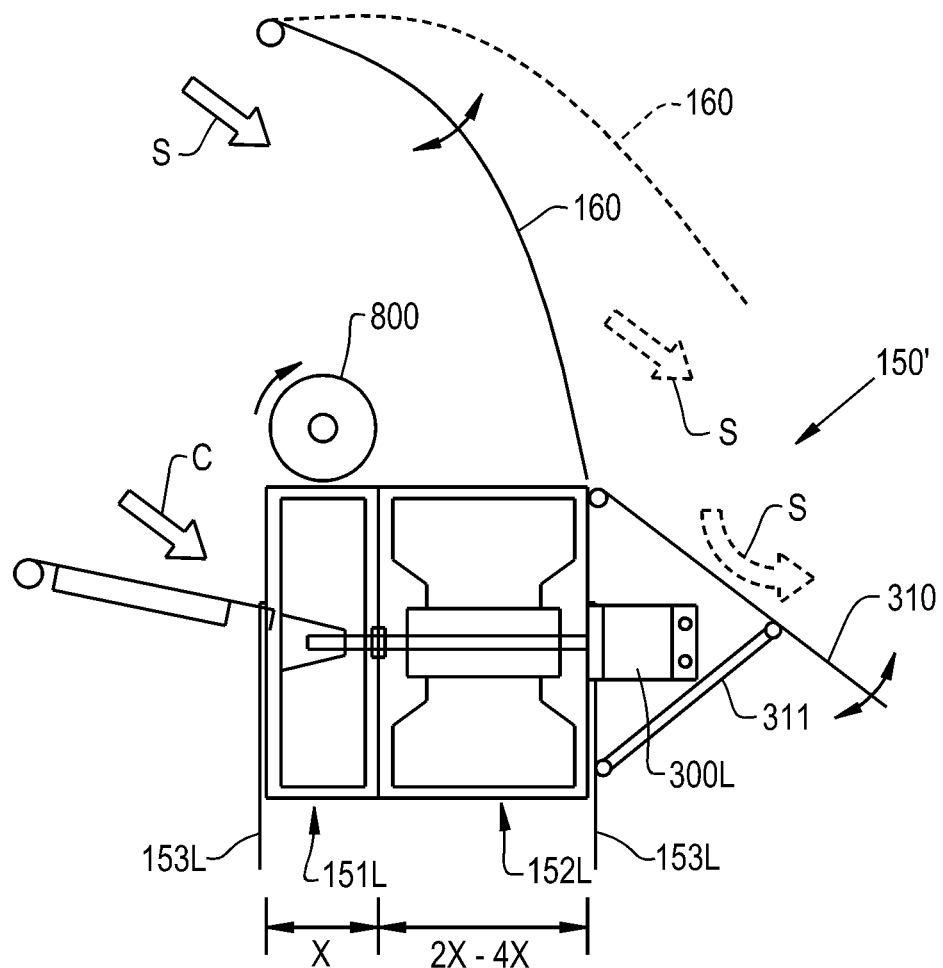
FIG. 8 is a schematized side view of a cross section of another embodiment of the spreader system coupled to the combine of FIG. 1, in accordance with another exemplary embodiment of the present invention.

Now, additionally referring to FIG. 8, and shown in an even more schematized form is another embodiment of spreader system 150, generally designated in FIG. 8 as 150', showing spreaders 151L and 152L, with spreader 151L having a width X and spreader 152L having a width that is 2 to 4 times as wide as X. Here an infeed roller 800 is used to help direct the path of straw S. Infeed roller 800 is positioned so that it can influence the flow characteristics of straw S. The rotational velocity of infeed roller 800 can be varied. The velocity can be varied dependent upon operator selections, or detected loads relative to the flow of straw S. The velocity can be increased when windrow door 160 is opened so that additional speed can be imparted to straw S as it moves outward from the aft end of combine 100. Straw S can be windrowed with the opening of door 160 to the dashed line position, which allows straw S to leave the combine in the path shown with a dashed arrow. Straw S is shown encountering windrow panel 310 in the form of a curved dashed arrow to illustrate the role that windrow panel 310 plays in directing the flow of straw S to a windrow on the ground. Windrow panel 310 is shown as being pivotal by way of the extension/retraction of adjusting actuator 311.

The movement of arms 154 and 155 is carried out by actuators 156 and 157, illustrated in FIG. 2, in a schematical form, as 156L, 156R, 157L and 157R. Actuators 156 are coupled to arms 154 and carry out the movement of chaff spreader devices 151. In a similar manner actuators 157 are coupled to arms 155 to carry out the movement of straw spreader devices 152. The actuators may be hydraulic, electric, pneumatic or of any other sort that can effect the pivotal movement of arms 154 and 155.

In the present invention independent, vertically oriented straw and chaff spreaders 152, 151 pivot about a co-axial transverse axis A3. The straw spreader 152 is mounted rearward of the chaff spreader 151. The straw spreader 152 can be rotated independent of the chaff spreader 151, or both can be rotated together, as particularly shown in FIG. 6.

Horizontal spreaders of the prior art may have a rearward component to the discharge trajectory that influences and disrupts the formation of a windrow. The present invention provides a vertically mounted chaff spreader 151 and straw spreader 152 to uniformly distribute the chaff C and straw S across the full cut width, even when windrowing the straw. The two spreader arrangement of the present invention improves the vertical spreader concept by better controlling the air and material flow inside the spreaders 151, 152. Instead of feeding the 1st material stream from the threshing rotor into the top of the spreader and a 2nd material stream from the cleaning system (chaff) into the front as is done with the prior art, the two spreaders of the present invention each receive the desired portion separately and the two streams are combined in the common discharge chute 153.

The spreader system 150 is a counter-rotating dual impeller spreader. A chaff spreader 151 is mounted with the rear surface co-planer to the front plane of the straw spreader 152. There may be a gap between spreaders 151 and 152 to accommodate the mounting of components therebetween. Spreaders 151 and 152 are respectively suspended by arms 154 and 155 at each side from a transverse pivot axis A3. Because the spreaders 151 and 152 are co-axial, one set of pivot arms 155 and latch 202 may be closer to the machine centerline than arms 154, which may be on the outside of plate 200. The arms 154 and 155 pivot against pivot plate 200 which has holes to correspond to a latching pin 201, 202 to secure the spreaders 151, 152 in the desired positions.

As shown in FIG. 8, an infeed roller 800 may be used above the chaff spreader 151 to reduce the likelihood of material accumulation on top of the chaff spreader frame that would result in a machine blockage.

A first stream of crop material S from the threshing rotor 111, generally includes the plant stalk and leaves, having the grain separated from that material by the threshing rotor 111. This 1st stream S is discharged by the threshing rotor to a discharge beater or chopper, according to the machine configuration, which further propels the MOG rearward to either a second dedicated chopper or spreader system 150. Straw hood frame deflectors guide the crop material S into the spreader 152 such that the impellers 157 receive the MOG and accelerate it downwardly, outwardly, and sidewardly across the harvested cut width. A second stream of crop is separated from the threshing rotor 111 and passes through the concave grate separation holes to the cleaning system 130 where the chaff C is separated from the grain by a winnowing process. The chaff C and small straw particles (which can also be called MOG) are blown rearward to the front chaff spreader 151. An oscillating pan bridges the distance from the end of the cleaning system to the chaff spreader 151. The chaff spreader 151 has an enclosing wrapper around the impellers 156 with a circumferential opening at the side to discharge the chaff C into the discharge chute 153. The chaff C enters the center of the impeller 156 and is moved radially outward by centrifugal force and airflow to the wrapper where it is discharged either downward through a controlled gap to the backsheet by the center divider deflectors. The chaff spreader 151 wrapper may be eccentric.

The primary mode of the spreaders 151, 152 is to be in a downward position (as shown in FIGS. 3 and 4) receiving crop material and spreading it to the side of the machine. However, for certain operations, it is desirable to not spread the straw S and only spread the chaff C. The rear spreader 152 may be unlatched and pivoted rearward by a biasing force that urges the spreader to rotate rearward and upward to a storage position (as shown in FIG. 5), about axis A3 45-60 degrees of rotation. This allows the 1st stream of MOG to be discharged directly onto the ground between the chaff spreader 151 and the raised straw spreader 152. The straw spreader 152 is rotated far enough rearward that it is substantially above the windrow formed on the ground. The chaff spreader 151 may also be moved rearward (as shown in FIG. 6) to windrow all of the crop material. Because the two spreaders have a common pivot axis A3, they will nest together, in the storage position, such that the impeller axes A1 and A2 remain concentric.

The preferred diameters of impellers 156 and 157 are that they have the same diameter; however, the impellers diameters may be slightly different by a few millimeters.

Advantages of the present invention include a dedicated, optimized spreader for the two material flow paths of a combine harvester that have a single discharge. The rear spreader 152 operates as an accelerator that receives material at the circumference and discharges the material circumferentially. The front chaff spreader 151 operates as a blower by receiving material in the center and moving the material radially outward to the circumference and discharging the material circumferentially. With the present invention there is the capability to operate with a towed biomass collecting cart behind the combine, for the collection of corn cobs or a baler for wheat straw. Each spreader 151, 152 may be equipped with a divider between the impellers that will permit metering of the crop material across the harvested width. The deflectors may control the clearance to the impellers and gap clearance to the backsheet of the spreader.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A spreader system of an agricultural vehicle for spreading crop residue, comprising:
   a first spreader device including a plurality of first paddles configured to rotate about a first axis, the rotation of the first paddles producing a first stream of crop residue;
   a second spreader device including a plurality of second paddles configured to rotate about a second axis, the rotation of the second paddles producing a second stream of crop residue;
   a chute into which the first stream of crop residue and the second stream of crop residue flow respectively from the first spreader device and the second spreader device, the first stream and the second stream of crop residue being combined in the chute; and
   a first set of arms coupled to the first spreader device, the first set of arms being pivotally coupled to the agricultural vehicle about a pivot axis, the first spreader device being pivotal from a first position to a second position that is upward and outward relative to the first position and to the agricultural vehicle.

2. The spreader system of claim 1, wherein the second spreader device and the first spreader device are positioned axially adjacent to each other.

3. The spreader system of claim 1, wherein the first axis and the second axis are coaxial when the first spreader devise is in the first position.

4. The spreader system of claim 1, wherein the first paddles are driven at a first rotational speed and the second paddles are driven at a second rotational speed, the first rotational speed being different than the second rotational speed.

5. The spreader system of claim 1, wherein the first axis and the second axis are generally horizontal when the first stream and the second stream are being combined in the chute.

6. The spreader system of claim 1, further comprising a second set of arms coupled to the second spreader device, the second set of arms being pivotally coupled to the agricultural vehicle about the pivot axis that is the same axis as the first set of arms pivot about.

7. The spreader system of claim 6, wherein the first spreader device is configured to swing away from the second spreader device about the pivot axis.

8. The spreader system of claim 1, further comprising a first power source rotating the first spreader device.

9. The spreader system of claim 8, wherein the first power source also rotates the second spreader device.

10. The spreader system of claim 8, further comprising a second power source rotating the second spreader device independent of the first spreader device.

11. A spreader system of an agricultural vehicle for spreading crop residue, comprising:
    a first spreader device including a plurality of first paddles configured to rotate about a first axis, the rotation of the first paddles producing a first stream of crop residue;
    a second spreader device including a plurality of second paddles configured to rotate about a second axis, the rotation of the second paddles producing a second stream of crop residue;
    a chute into which the first stream of crop residue and the second stream of crop residue flow respectively from the first spreader device and the second spreader device, the first stream and the second stream of crop residue being combined in the chute;
    a first set of arms coupled to the first spreader device, the first set of arms being pivotally coupled to the agricultural vehicle about a pivot axis; and
    a second set of arms coupled to the second spreader device, the second set of arms being pivotally coupled to the agricultural vehicle about the pivot axis.

12. The spreader system of claim 11, wherein the first spreader device is configured to swing upward and outward from the chute and the second spreader device, the second spreader device is configured to swing upward and outward with the chute toward the first spreader device.

13. The spreader system of claim 11, wherein the first axis and the second axis are coaxial when the first spreader device and the second spreader device are adjacent each other.

14. An agricultural vehicle for harvesting a crop, the vehicle comprising:
 a threshing system producing a first stream of crop residue;
 a cleaning system producing a second stream of crop residue; and
 a spreader system including:
  a first spreader device including a plurality of first paddles configured to rotate about a first axis, the rotation of the first paddles encountering the first stream of crop residue;
  a second spreader device including a plurality of second paddles configured to rotate about a second axis, the rotation of the second paddles encountering the second stream of crop residue;
  a chute into which the first stream of crop residue and the second stream of crop residue flow respectively from the first spreader device and the second spreader device, the first stream and the second stream of crop residue being combined in the chute; and
 a first set of arms coupled to the first spreader device, the first set of arms being pivotally coupled to the agricultural vehicle about a pivot axis, the first spreader device being pivotal from a first position to a second position that is upward and outward from the first position relative to the agricultural vehicle.

15. The agricultural vehicle of claim 14, wherein the second spreader device and the first spreader device are positioned axially adjacent to each other.

16. The agricultural vehicle of claim 14, wherein the first axis and the second axis are coaxial.

17. The agricultural vehicle of claim 14, wherein the spreader system further comprises a first set of arms coupled to the first spreader device, the first set of arms being pivotally coupled to the agricultural vehicle about a pivot axis.

18. The agricultural vehicle of claim 17, wherein the first spreader device is configured to swing away from the second spreader device about the pivot axis.

19. The agricultural vehicle of claim 17, further comprising a second set of arms coupled to the second spreader device, the second set of arms being pivotally coupled to the agricultural vehicle about the pivot axis.

20. The agricultural vehicle of claim 19, wherein the first spreader device is configured to swing upward and outward from the chute and the second spreader device, the second spreader device is configured to swing upward and outward with the chute toward the first spreader device.

\* \* \* \* \*